E. D. STREET.
Thrashing Machine.
No. 59,291. Patented Oct. 30, 1866.
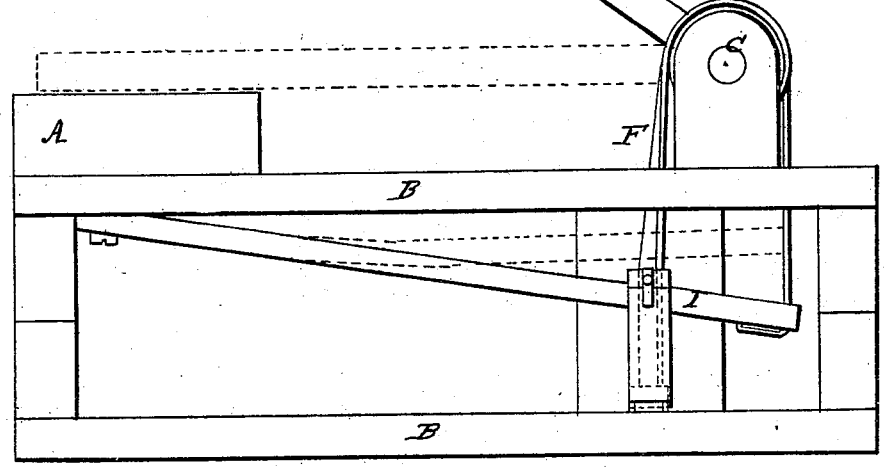
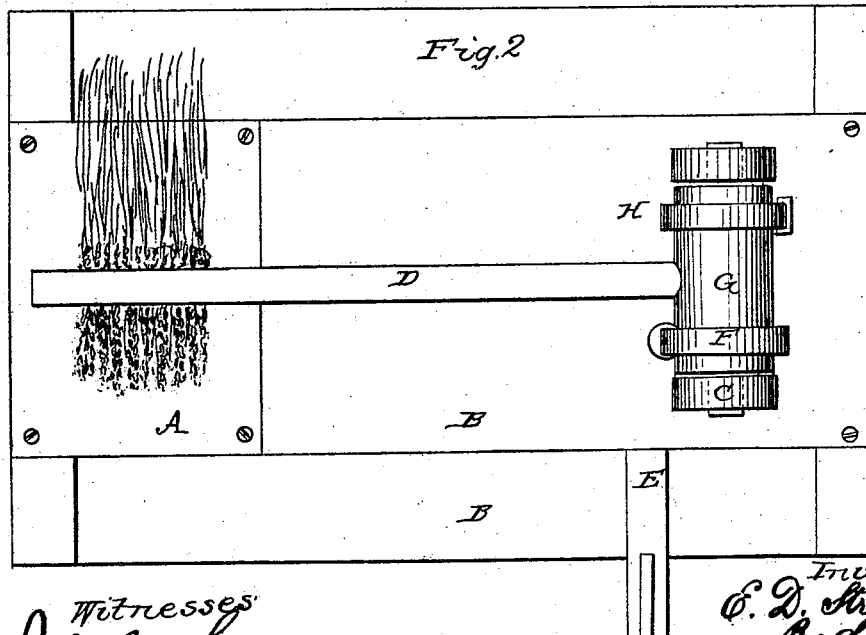

UNITED STATES PATENT OFFICE.

E. DWIGHT STREET, OF EAST HAVEN, CONNECTICUT.

IMPROVEMENT IN THRASHING-MACHINES.

Specification forming part of Letters Patent No. 59,291, dated October 30, 1866.

*To all whom it may concern:*

Be it known that I, E. DWIGHT STREET, of East Haven, in the county of New Haven and State of Connecticut, have invented a new Improvement in Grain-Thrashers; and I do hereby declare the following, when taken in connection with the accompanying drawings and the letters of reference marked thereon, to be a full, clear, and exact description of the same, and which said drawings constitute part of this specification, and represent, in—

Figure 1, a side view, and in Fig. 2 a top view.

This invention is designed for thrashing grain, using the foot of the operator as the power while guiding the grain beneath the beaters with his hands; and consists in the arrangement of one or more beaters, in combination with a table, the beaters arranged in connection with a treadle, so that the foot of the operator depressing the treadle forces the beaters down upon the table or the grain placed thereon, and a spring or its equivalent arranged so as to quickly raise the beaters from the table.

To enable others to construct and use my improvement, I will proceed to describe the same as illustrated in the accompanying drawings.

A is a table placed upon a frame-work, B, of any convenient construction, which said frame-work supports in proper bearings C a beater, D. Below and near the floor is placed a treadle, E, connected with the beater by a strap, F, and running up around the cylinder G, to which the beater is fixed, as seen in Fig. 2, so that when the treadle is depressed, as denoted in red, Fig. 1, the beater is brought down upon the table, as also denoted in red, Fig. 1.

A second strap, H, is attached to the cylinder G upon the opposite side of the strap F, and, extending down, is attached to a spring, I, or its equivalent, so that when the beater is depressed the spring is raised to the position denoted in red; and when the beater is released from the action of the treadle the spring I will quickly raise the beater, as denoted in Fig. 1. This completes the construction of my improvement. Its operation is as follows:

Place one foot (the right) upon the treadle E, and with the hands place the grain upon the table, moving it to and fro thereon, bringing the beater rapidly and forcibly upon the grain, by which operation the grain is separated as in ordinary thrashing.

I have illustrated my invention as having but one beater, yet several beaters attached to the same cylinder may be employed; and the operation of thrashing would, doubtless, be facilitated by the employment of one person at the treadle and a second to supply the grain.

Having, therefore, thus fully described my invention, what I claim as new and useful, and desire to secure by Letters Patent, is—

The combination of the beater D, (one or more,) the table A, treadle E, and spring I, arranged to operate in the manner described.

E. DWIGHT STREET.

Witnesses:
 JOHN H. SHUMWAY,
 ALTSIE J. TIBBITS.